Jan. 22, 1935.  F. TASHER  1,988,580
APPARATUS FOR SEVERING SHEET GLASS
Filed Aug. 15, 1933   3 Sheets-Sheet 3
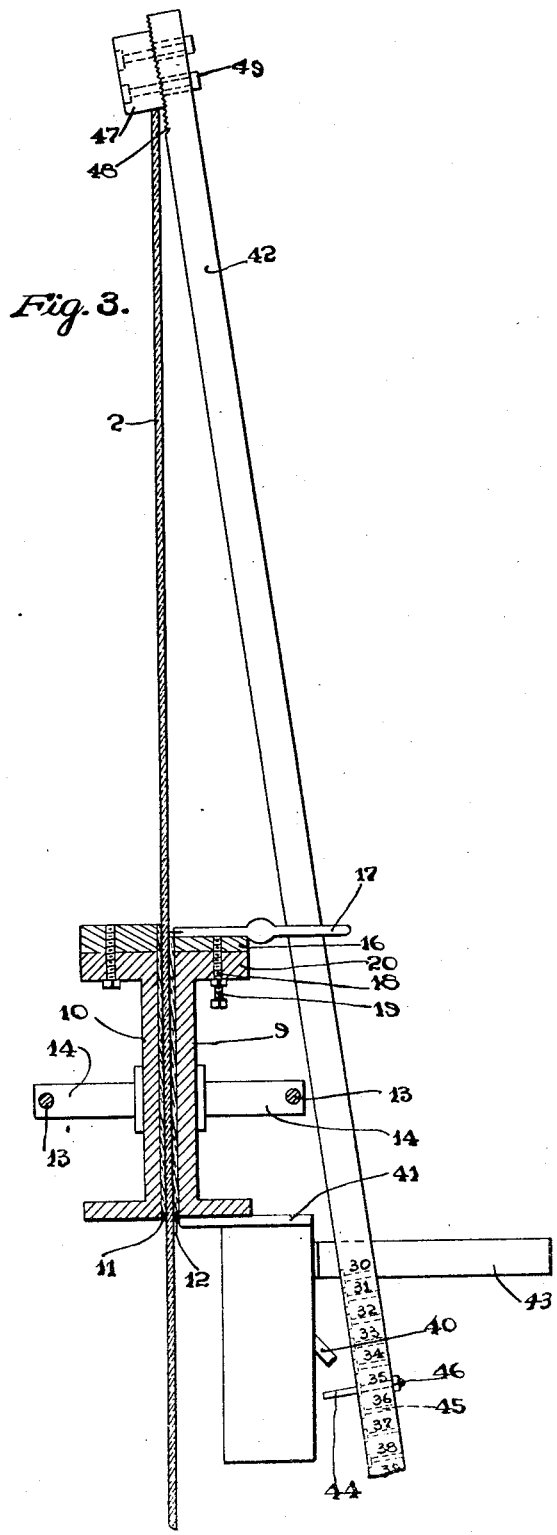
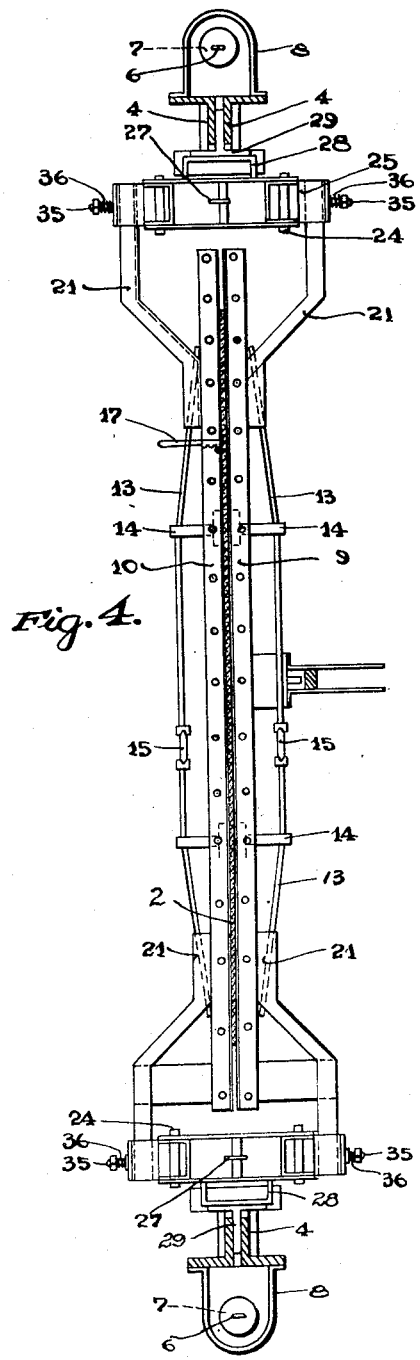
INVENTOR
FRED TASHER.
BY
ATTORNEYS.

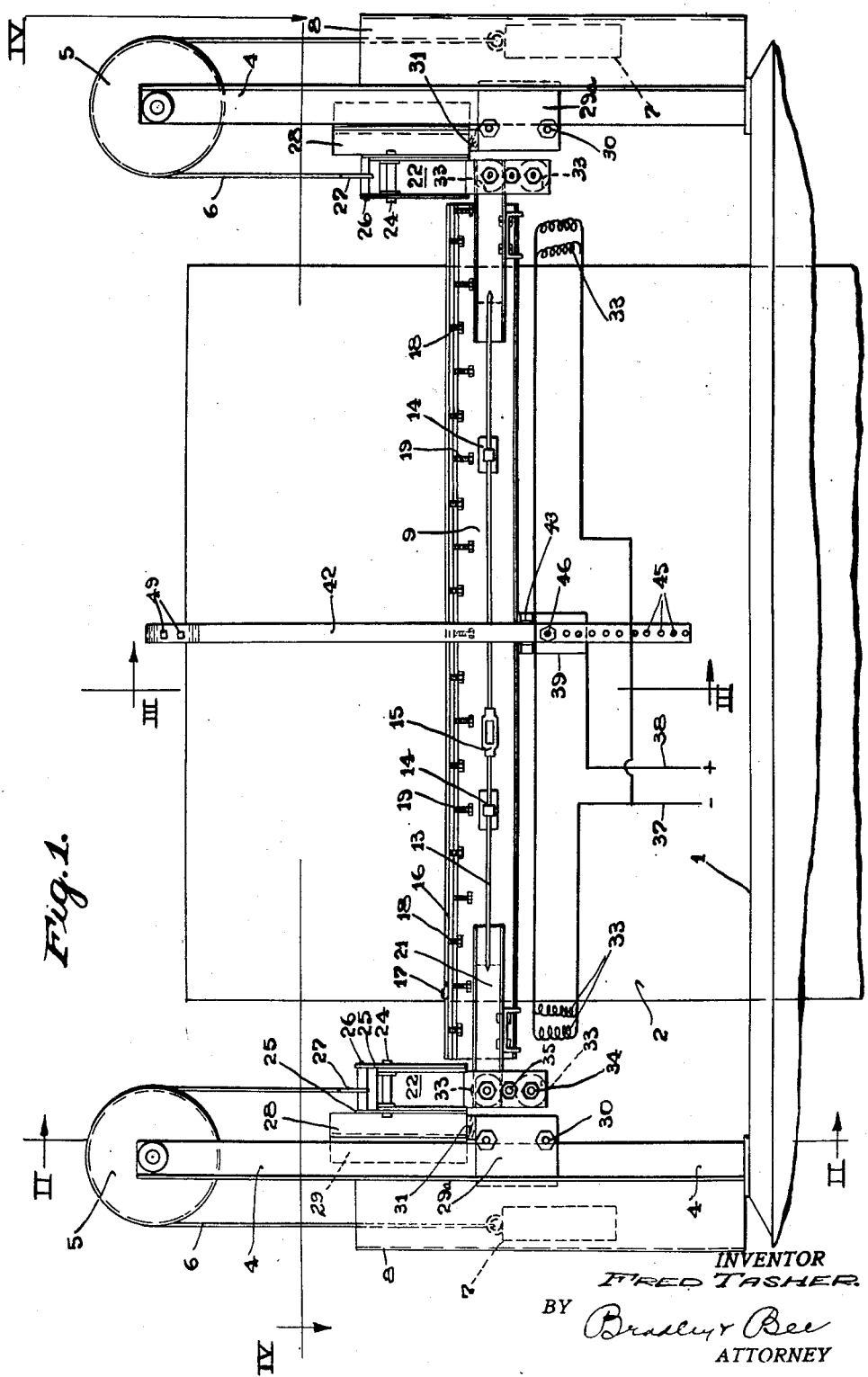

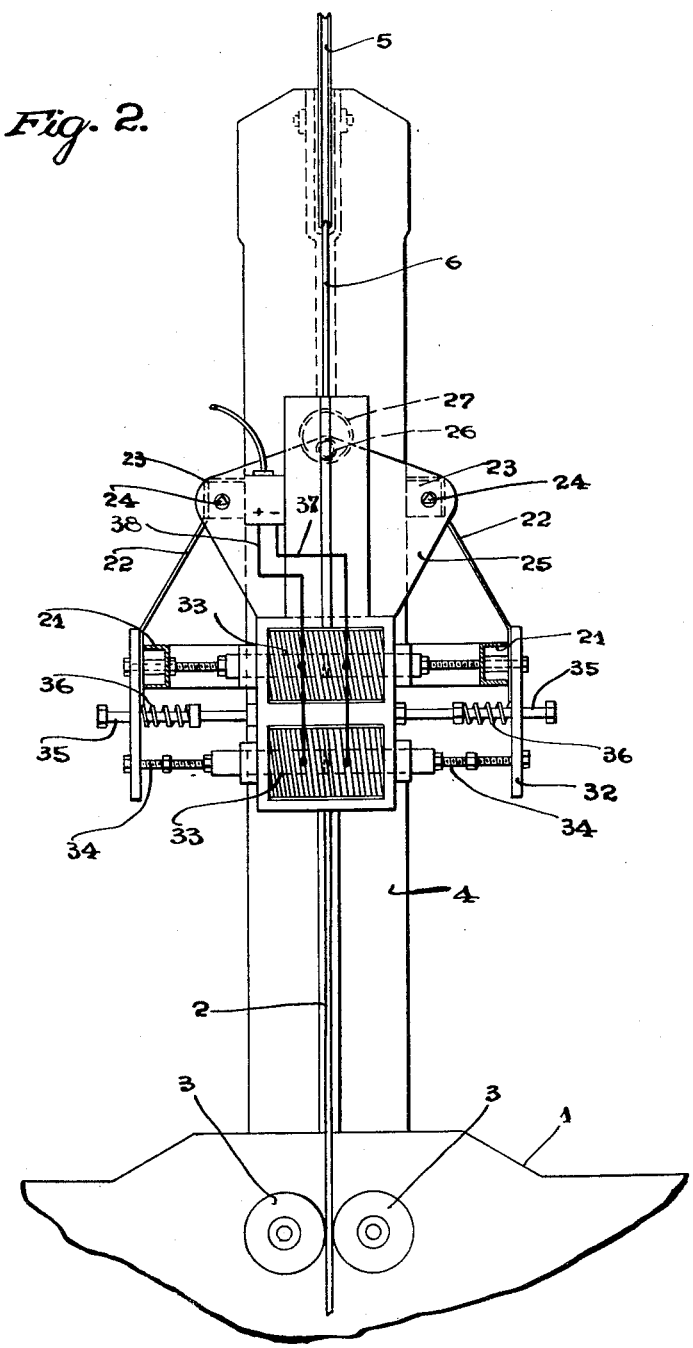

Patented Jan. 22, 1935

1,988,580

UNITED STATES PATENT OFFICE 1,988,580

APPARATUS FOR SEVERING SHEET GLASS

Fred Tasher, Henryetta, Okla., assignor to Pittsburgh Plate Glass Company, a corporation of Pennsylvania Application August 15, 1933, Serial No. 685,221

7 Claims. (Cl. 33—32)

The invention relates to apparatus for severing a continuously drawn sheet of glass as it emerges from the annealing leer drawing apparatus. It has for its principal objects the provision of an improved apparatus for severing the glass sheet into strips or sections of any desired width without the exercise of any particular degree of skill on the part of the operator and with a minimum amount of breakage. Further objects are the provision of a cutting rule and clamping plate cooperating therewith which remain straight and true when clamping force is applied at their ends, and in which provision is made for maintaining the cutter guide plate at the upper edge of the rule straight and true. A further object is to provide a construction for clamping the glass sheet which will eliminate any tendency of the fracture incident to the cutting off operation from running down into the sheet at an angle to the line of cut. A still further object is to provide improved means securing the automatic clamping of the rule to the glass sheet when the section to be cut attains the length for which the apparatus is set. One embodiment of the invention is illustrated in the accompanying drawings, wherein:

Figure 1 is a front view of the apparatus. Fig. 2 is a sectional view on the line II—II of Fig. 1. Fig. 3 is a section on the line III—III of Fig. 1. And Fig. 4 is a horizontal section on the line IV—IV of Fig. 1.

Referring to the drawings, 1 is the floor upon which the apparatus rests, and 2 is a glass sheet which is continuously fed upward through the floor from the glass drawing apparatus and an annealing leer, the upper two rolls of which 3, 3 are shown in Fig. 2. The apparatus is supported upon a pair of vertical standards 4, 4 rigidly secured to the floor and each consisting of a pair of angles, as shown in Fig. 4. The upper ends of the standards carry sheaves 5, 5 over which pass the cables 6, 6 for supporting the movable portion of the apparatus, such cables carrying at their other ends the counterweights 7, 7 working in protecting casings 8, 8.

On the front side of the glass is the cutting rule 9, and in opposition to this rule on the other side of the glass is the clamping plate 10 arranged so that during the cutting operation, the two members are clamped to the glass sheet and move upward therewith as more fully described later. The cutting rule and the clamping plate are similar in construction, being in the form of channels and faced on the sides next to the glass with sheets of asbestos 11 and 12, as indicated in Fig. 3. The use of the asbestos gives yielding contact with the glass so that any injury to the glass is avoided and performs the further function of preventing any cracking of the glass downward during the cutting operation. The members 9 and 10 are stiffened by the use of the tie rods 13, 13 secured at their ends to the members and passing over the struts 14, each rod being provided with a turnbuckle 15 for tightening it. As later pointed out, the rule and clamping plate are forced toward each other at their ends to perform the clamping action and this tends to cause the members 9 and 10 to bulge out at their central portions. The use of the tie rods prevents this bulging action so that the members are in contact with the glass sheet throughout its width. The upper edge of the rule 9 is provided with a guide plate 16, on which the cutter's tool 17 rests as he draws it across the sheet in scoring the glass; and in order to hold this plate in position and to level it, two sets of screws 18 and 19 are employed (Figs. 1 and 3). The screws 19 are threaded through the flange 20 of the rule and bear against the lower surface of the plate 16, while the screws 18 extend freely through the flange 20 and are threaded into the plate 16, so that they act as clamping screws to pull the plate down tightly against the ends of the level screws 18. By this means, a perfectly level guide surface is provided for the cutting tool 17.

Bolted to the ends of the members 9 and 10 are the pairs of channels 21 by means of which the members 9 and 10 are supported. The construction for supporting the members 9 and 10 at their ends and for pulling them together to clamp the glass sheet therebetween, is the same at both ends of the members 9 and 10 so that a description of the construction at one end will suffice for both. The channels 21, 21 are supported by the hangers 22, 22 which are provided with box ends 23 at their upper extremities that are perforated and receive the triangular pivot pins 24, 24. These triangular pivot pins are mounted at their ends in a pair of plates 25 spaced apart to receive the hangers therebetween, as indicated in Fig. 1, and connected at their upper ends by a rod 26. The end of the cable 6 is attached to this rod by means of the ring 27. The plate 25 which is nearest the standard 4 has welded thereto a channel 28 (Fig. 4) carrying an angle 29, whose flange lies between the two vertical angles which make up the standard 4. The parts 28 and 29 thus constitute a guide means which cooperates with the standard 4 to guide the movable part of the apparatus in its up and down movement. The downward movement of the parts is limited by suitable stop means carried by the standard 4, such stop means comprising a pair of plates 29a clamped to the standard 4 by means of the bolts 30 and carrying at its upper end the block 31 which is adapted to engage the lower end of the channel 28 when the rule and clamping plate arrive at their lower extreme of movement. The stop means may be adjusted on the standard 4 to suit the convenience of the operator.

Secured to the channels 21, 21 on the outer sides of the hangers 22 are a pair of plates 32, 32, and between these plates is located the means for pulling the rule and clamping plate together to grip the glass sheet therebetween during the scoring operation. This operating means is in the form of a pair of solenoids 33, 33 placed one above the other and each provided with a pair of plungers 34, 34 which extend through the plates 32, 32. When the windings of the solenoids are energized, the plates 32, 32 are drawn towards each other, thus causing the rule and clamping plate to grip the glass sheet so that these parts move upward with the glass. In order to separate the plates 32, 32, after the cutting operation is completed and after the current to the solenoid windings is interrupted, the rods 35, 35 are provided extending slidably through the plates 32, 32 and carrying the compression springs 36, 36.

The wiring diagram of the coils of the solenoids is shown in Fig. 1, wherein 37 and 38 are the leads for supplying the current, and 39 is a switch in the line of flow, such switch being provided with an operating handle 40, as shown in Fig. 3. By throwing the switch, which is carried on a bracket 41 on the rule 9, the operator can control the clamping and unclamping action of the rule and the plate 10. The throwing on of the current may also be accomplished automatically when the sheet has attained the proper length above the rule for the cutting off operation by the use of the bar 42 which is adapted to hook over the top edge of the sheet and throw the switch by means of an abutment at the lower end of the bar when the sheet has attained the proper length. The lower portion of the bar is guided between a pair of plates 43 projecting from the casing of the switch 39, and such lower end is provided with graduations 30, 31, 32, etc., indicating the length of the sheet. The abutment or throwout stop consists of a plate 44 having a stem adapted to project through perforations 45 in the bar, which stem is clamped in position by means of the nuts 46. In this manner, the length of the sheet in inches may be adjusted. At the upper end of the bar 42 is a block 47 which is hooked over the top edge of the sheet. The bar has on its rear side a series of notches 48 fitting corresponding notches on the block and the block is clamped in position by means of the bolts 49. The bases of the notches are one-eighth of an inch apart so that by means of this block, the length of the sheet cut-off may be adjusted in fractions of an inch.

When the sheet reaches the proper length for cut off, the abutment 44 engages the switch handle 40 and throws the switch, thus energizing the windings of the solenoid and causing the rule to be clamped to the sheet. The cutter then uses the tool 17 to score the sheet and applies a slight amount of pressure to the sheet transversely thereof to crack it off, after which he throws the switch handle 40 to cut-off position, thus completing the operation. After the glass section is cracked off and the clamping device is released, the movable parts are carried by gravity back to the starting position, as shown in Fig. 1, with the lower end of the members 28 in engagement with the stops 31.

What I claim is:

1. Apparatus for severing a continuously formed advancing sheet of glass, comprising a cutting rule and clamping plate mounted on opposite sides of the sheet for movement therewith with the clamping plate provided with a yielding surface for engaging the glass and positioned so that a portion of the plate backs up the line of cut along which a scoring tool is guided on the rule, and means for causing a movement of approach between the rule and plate to clamp the sheet therebetween.

2. Apparatus for severing a continuously formed advancing sheet of glass, comprising a cutting rule and clamping plate mounted on opposite sides of the sheet for movement therewith with the clamping plate provided with a yielding surface for engaging the glass and positioned so that a portion of the plate backs up the line of cut along which a scoring tool is guided on the rule, guide means for the rule and plate on which said parts move freely in parallel with the line of movement of the sheet, and means for causing a movement of approach between the rule and plate to clamp the sheet therebetween.

3. Apparatus for severing a continuously formed advancing sheet of glass, comprising a cutting rule and clamping plate mounted on opposite sides of the sheet for movement therewith with the clamping plate provided with a yielding surface for engaging the glass, a flange on the upper edge of the rule extending to the rear, a guide plate for the cutting tool on said flange, cooperating means between the flange and guide plate for leveling the guide plate, and means for causing a movement of approach between the rule and the clamping plate to clamp the sheet therebetween.

4. Apparatus for severing a continuously formed advancing sheet of glass, comprising a cutting rule and clamping plate mounted on opposite sides of the sheet for movement therewith with the clamping plate provided with a yielding surface for engaging the glass, a flange on the upper edge of the rule extending to the rear, a guide plate for the cutting tool on said flange, cooperating means between said flange and the guide plate for leveling the guide plate, consisting of two sets of screws spaced along the guide plate, one set constituting an adjusting means for the plate and the other set a clamping means therefor, and means for causing a movement of approach between the rule and the clamping plate to clamp the sheet therebetween.

5. Apparatus for severing a continuously formed advancing sheet of glass, comprising a cutting rule and clamping plate mounted on opposite sides of the sheet for movement therewith, means for moving the rule and plate toward each other to clamp the sheet therebetween, comprising solenoids operated by an electric circuit including a switch carried by the rule, and means operated by the movement of the upper edge of the glass sheet for closing the switch when the sheet has arrived at a predetermined length, said means comprising a bar guided for movement past the switch which hooks over the upper edge thereof and has a stop means which is adapted to engage the switch.

6. Apparatus for severing a continuously formed advancing sheet of glass, comprising a cutting rule and clamping plate mounted on opposite sides of the sheet for movement therewith, means for moving the rule and plate toward each other to clamp the sheet therebetween, comprising solenoids operated by an electric circuit including a switch carried on the rule, and means operated by the movement of the upper edge of the glass sheet for closing the switch when the sheet has arrived at a predetermined length, said means comprising a bar guided for movement past the switch which hooks over the upper edge thereof and has a stop which is adjustable longitudinally of the bar and is adapted to engage the switch.

7. Apparatus for severing a continuously formed advancing sheet of glass, comprising a cutting rule and clamping plate mounted on opposite sides of the sheet for movement therewith, means for moving the rule and plate toward each other to clamp the sheet therebetween, comprising solenoids operated by an electric circuit including a switch carried by the rule, and means operated by the movement of the upper edge of the glass sheet for closing the switch when the sheet has arrived at a predetermined length, said means comprising a bar guided for movement past the switch and having an abutment at its upper portion adjustable longitudinally of the bar and adapted to hook over the upper edge of the sheet, the lower portion of the bar being provided with an abutment adapted to engage the switch.

FRED TASHER.